(12) United States Patent
Crump

(10) Patent No.: US 7,690,516 B1
(45) Date of Patent: Apr. 6, 2010

(54) VEHICLE RACK

(76) Inventor: Jeffrey D. Crump, 7422 E. Northridge Cir., Mesa, AZ (US) 85207

( * ) Notice: Subject to any disclaimer, the term of this patent is extended or adjusted under 35 U.S.C. 154(b) by 536 days.

(21) Appl. No.: 11/555,917

(22) Filed: Nov. 2, 2006

Related U.S. Application Data

(60) Provisional application No. 60/733,053, filed on Nov. 2, 2005.

(51) Int. Cl.
*A47F 7/00* (2006.01)
(52) U.S. Cl. ......................................................... 211/19
(58) Field of Classification Search .................. 211/17, 211/19, 20, 24, 23; 248/346.01, 304, 346.03; 224/924, 571; 410/3; 280/402; D12/407, D12/408
See application file for complete search history.

(56) References Cited

U.S. PATENT DOCUMENTS

| 418,829 | A | * | 1/1890 | Towle ............................ 211/5 |
|---|---|---|---|---|
| 446,835 | A | * | 2/1891 | Kennedy ....................... 211/20 |
| 529,939 | A | * | 11/1894 | Noderer ........................ 211/20 |
| 565,058 | A | * | 8/1896 | Westphal ...................... 70/234 |
| 665,057 | A | * | 1/1901 | Brower ........................ 206/214 |
| 731,651 | A | * | 6/1903 | Allen ............................ 211/20 |
| 3,603,459 | A | * | 9/1971 | Erb ............................... 211/20 |
| 3,785,517 | A | * | 1/1974 | Brajkovich ................. 414/462 |
| 4,437,597 | A | * | 3/1984 | Doyle .......................... 224/533 |
| 5,036,986 | A | * | 8/1991 | Kral ............................. 211/22 |
| 5,078,277 | A | * | 1/1992 | Tschritter ..................... 211/20 |
| 5,267,657 | A | * | 12/1993 | McGuiness et al. ........... 211/22 |
| 5,702,007 | A | * | 12/1997 | Fritz et al. ..................... 211/17 |
| 6,062,396 | A | * | 5/2000 | Eason .......................... 211/20 |
| 6,581,785 | B1 | * | 6/2003 | Falkenstein ................... 211/24 |
| 6,640,979 | B1 | * | 11/2003 | Mayfield ...................... 211/20 |
| 6,755,309 | B1 | * | 6/2004 | Runge .......................... 211/20 |
| 6,866,282 | B2 | * | 3/2005 | Heerspink ................... 280/296 |
| 7,051,909 | B2 | * | 5/2006 | Gibson ........................ 224/403 |

* cited by examiner

*Primary Examiner*—Jennifer E. Novosad
(74) *Attorney, Agent, or Firm*—Schmeiser, Olsen & Watts LLP

(57) ABSTRACT

A rack for storing a wheeled vehicle include a base, a raised portion and a finger. The rack also includes a socket into which a wheel of the vehicle may be inserted. The rack may be mounted to either a vertical or a horizontal surface.

13 Claims, 10 Drawing Sheets

VEHICLE RACK

This application claims priority to U.S. Provisional Patent Application Ser. No. 60/733,053 filed Nov. 2, 2005, entitled VEHICLE RACK, by Jeffrey D. Crump, the disclosure of which is incorporated herein by reference.

BACKGROUND OF THE INVENTION

1. Technical Field

This invention generally relates to a rack for storing a wheeled vehicle. Specifically, the rack includes a channel into which a wheel of a scooter may be inserted. The rack can be mounted either vertically or horizontally.

2. State of the Art

A need has arisen from the extensive use of human propelled scooters. People, and in particular children need a convenient and secure mechanism for storing their scooters. Otherwise, the tendency is to leave the scooters in the driveway, garage, or in another cluttering or dangerous location. There is often no good place to store the scooters. Because the scooters have wheels, they are not so easily supported in an upright position without inadvertent rolling away. Furthermore, the person storing the scooters often settles for leaning the handles against a wall, which is not very orderly or attractive.

DISCLOSURE OF THE INVENTION

In a simple form, a rack for a wheeled vehicle in accordance with the present invention may include a base having a depth and a width dimension each greater than a height dimension. The rack may also have at least one first stop supported on the base and positioned with at least one first abutment generally facing in a first direction along a first height axis. At least one second stop may be supported on the base and positioned with at least one second abutment generally facing in a second direction along a second depth axis. A plurality of third stops may be supported on the base and positioned with a respective plurality of third abutments generally facing in at least two opposite directions along a third width axis. The first, second, and third stops may thus form a socket adapted to receive a wheel of the vehicle.

The rack may further include an additional first stop having an additional first abutment supported on the base, the additional first abutment facing in a direction opposite to the at least one first abutment along the first height axis.

The rack may further include an additional second stop having an additional second abutment supported on the base, the additional second abutment adapted to engage the wheel at a position opposite to the at least one second abutment along the second depth axis.

The plurality of third stops may be formed by opposite walls including respective abutments where the walls form a channel therebetween into which at least a portion of the wheel may be inserted. The wheel may further advantageously be rollably inserted between the walls.

The base may include a generally disc shaped structure with mounting elements on the disc shaped structure. Alternatively, the base may be any other shape such as circular, oval, square, rectangle, polygonal, etc. The mounting elements may include through openings for receiving fasteners. Alternatively, one or more of hooks, loops, adhesive, clip(s), pin(s), latch(es) may be used to attach the rack to a floor or wall.

Walls may be formed on an inner portion of a raised part of the base or a part added to the base. The raised part or part added to the base may be generally in the form of a horseshoe. However, the taper of the raised part or part added may be configured such that a section on a plane extending in a width direction would provide a section that is generally pyramid shaped. This configuration has the advantage of providing great strength against tipping of the wheel and the vehicle to which it is attached once the wheel has been received into the channel of the raised part or part added. Furthermore, a taper in the depth direction from an upper edge to the base also provides great strength against sheer forces when the rack is mounted on a vertical wall, for example.

The raised part or part added may have an upper edge in a height direction and the part may be tapered downwardly and away from the channel. Thus, the raised part or part added may be connected to the rest of the base or disc shaped structure by a smoothly tapered aesthetic transition. In fact, the raised part or part added may be integrally molded as one piece with the base.

A lower portion of the channel may form the at least one first stop with an abutment facing in the vertical direction. A finger may be supported in or on the channel and extend upwardly out of the channel. The finger may be an arcuate finger that extends arcuately in both of a vertical and in a depth direction overlying at least a portion of the channel. Alternatively, the finger may have another configuration such as straight, angled or square.

The arcuate finger may have an arcuate portion with an arc extending through an angle in a range from approximately ten to ninety degrees. In another range, the arc may extend from twenty to eighty degrees. In another range the arc may extend from thirty to seventy degrees. It is to be understood that the arc may extend through any angle within these ranges. Additionally, it is to be understood that the arc of the arcuate finger may extend through an angle greater than ninety degrees and provide a reentrant configuration for receiving the wheel. In fact, a spring loaded characteristic may be provided by the arcuate finger for holding the wheel against inadvertent removal once inserted in the channel and at least partially surrounded by the arcuate finger.

The arcuate finger may also have a channel that surrounds a wheel on opposite width direction sides of the wheel. Thus, once inserted into the channel of the part and the channel of the arcuate finger, the wheel and the vehicle to which the wheel is attached may be inhibited from tipping sideways.

The channel of the raised part or part added may have an opening therethrough. Thus, any drippings from a wet wheel inserted therein will be permitted to pass through the opening for improved drainage. Reinforcement of the raised portion or portion added may include webbing structure in a height and/or depth directions. This is especially so for a molded plastic embodiment of the rack. That is, the web structure may be integrally molded on an underside of the raised portion and/or on an underside of the channel disposed in the raised portion as shown in the bottom view of FIG. 7, as described below.

The arcuate finger may also have reinforcement webbing such as in the form of a dorsal fin shown in the top view of FIG. 6 described below.

While the rack of the present invention has been described as having a height, depth, and width such that the rack may be mounted on a generally horizontal floor or the ground, it is to be understood that the rack of the present invention can additionally or alternatively be mounted on a vertical wall. In this vertically mounted position, the height may still be measured in a dimension away from the wall. The depth may be in a direction of insertion, and the width may be in a direction transverse to each of the height and the depth. When mounted on a vertical wall, the arcuate finger of the rack of the present invention may be oriented to extend outwardly and upwardly. Thus, a user may insert the wheel into the channel of the arcuate finger and the channel of the raised portion. The rest of the vehicle may thus hang from the rack. Another wheel or other part of the vehicle may engage the wall to which the rack is mounted. Alternatively, the raised portion may protrude and engage a portion of the vehicle in a supportive manner.

In another simple form, a rack for a wheeled vehicle in accordance with the present invention may include a base, a raised portion, a first channel formed in the base and the raised portion, an arcuate finger, and a second channel formed in the arcuate finger. The arcuate finger may extend in both a vertical and a depth direction overlying a portion of the first channel. Together, the first channel and the second channel may form a socket. The size and shape of the socket may be slightly larger than the size and shape of the wheel of the vehicle. The base may be generally disc shaped. The raised portion may taper downwardly and away from the first channel and may have a generally horseshoe-shaped configuration surrounding the first channel. An upper edge of the raised portion may have a tapered configuration in a depth direction such that a thickness of the upper edge is greater in the curved portion of the horseshoe shaped configuration. The rack may also have a through hole in a base of the first channel.

In still another simple form, a rack for a wheeled vehicle in accordance with the present invention may include a base, a raised portion on the base, and opposing abutments on the raised portion. The rack may also include a depth abutment supported on the base. A channel of the raised portion may include a slope extending downwardly and forwardly toward the depth abutment. The rack may also include a first height abutment in the channel of the raised portion and a second height abutment overlying the first height abutment.

A method of using the present invention may include inserting a wheel of a vehicle between opposing abutments on a base or a raised part of a base for inhibiting sideward tipping of the vehicle by such insertion. The method may also include abutting the wheel on one or both sides of a wheel of a vehicle in a width direction of the wheel. The method may include abutting the wheel in a depth direction or positively stopping the wheel by a depth abutment supported on a base. The method may also include urging the wheel toward the depth abutment by a slope extending downwardly and forwardly toward the depth abutment in a channel receiving the wheel.

The method may include abutting the wheel on a first height abutment in a channel of a raised part or a part added to a base of the rack. The method may also include abutting the wheel with a second height abutment overlying or facing the first height abutment.

The method may include rollably inserting the wheel in a socket formed by two or more abutments of the rack. The method may include inserting the wheel in a socket formed by a channel in a raised part and/or a channel in an arcuate finger supported on the raised part.

While the present invention has been described with regard to human propelled scooters generally and the illustrations show use of the racks with regard to Razer™-type scooters, it is to be understood that the rack may be implemented more generally with any of a variety of wheeled vehicles including, but not limited to bicycles, skates, rollerblades, motorized scooters, and others.

DETAILED DESCRIPTION OF EMBODIMENTS OF THE INVENTION

Figure 1A:
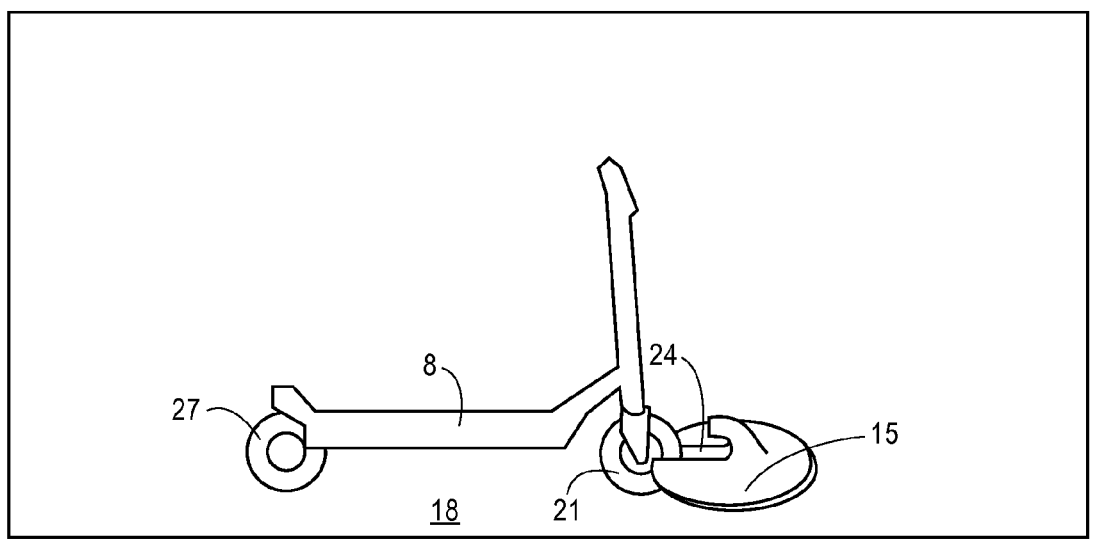
FIGS. 1A and 1C are perspective views showing a scooter being stored using the vehicle rack according to the present invention.
Figure 1B:
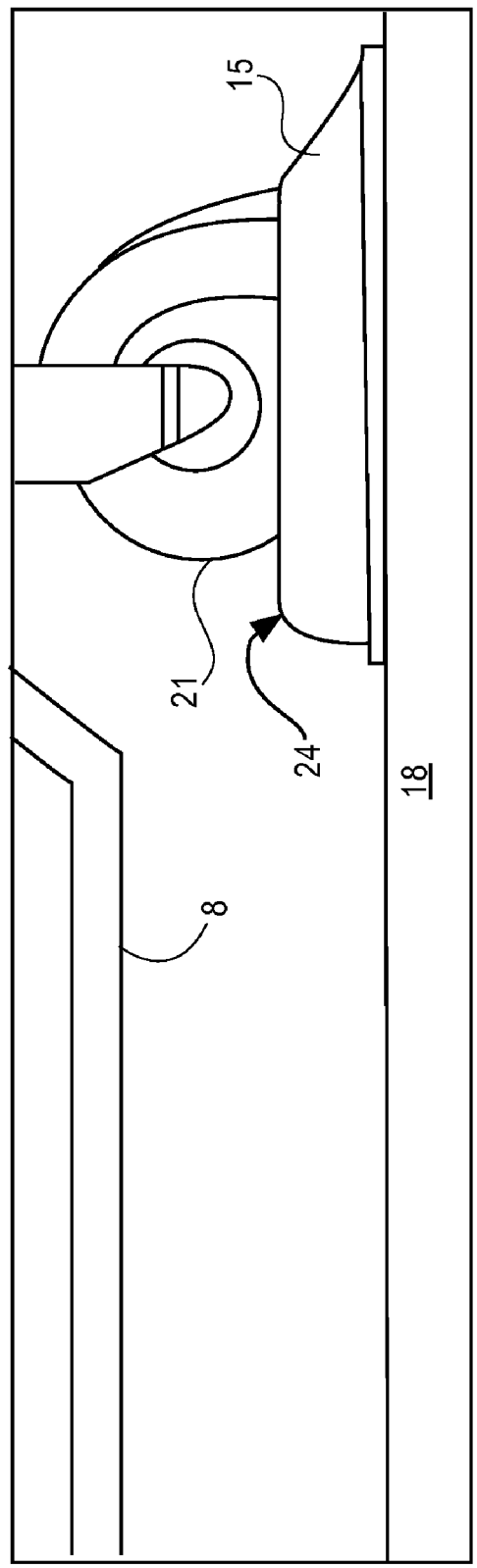
FIGS. 1B and 1D are enlarged views of the vehicle wheel in relation to the vehicle rack according to the present invention.

As discussed above, embodiments of the present invention relate to an apparatus and method for storing scooters. A rack 15 in accordance with the present invention may be placed or mounted on a floor 18 or the ground in a selected position for neatly receiving a scooter 8, as shown in FIG. 1A. A front wheel 21 may be rollably inserted into a channel 24 of the rack, as shown in FIG. 1B. In this view, a depth direction extends along a depth axis corresponding to a direction of insertion of the scooter into the rack 15. For the purposes of this disclosure, a height axis defining height directions is in a direction transverse to or perpendicular to a plane of the base of the rack. A width direction extends in a direction transverse or perpendicular to a longitudinal direction of the base channel and generally parallel to the plane of the base. Alternatively to a front wheel being inserted, a rear wheel 27 could be inserted in the channel 24. More than one rack may be mounted on the floor 18. Although the scooters 8 may be supported in the racks 15, it may be appreciated that the racks 15 of the present invention provide an attractive port that holds the scooters upright by receiving one of the wheels 21 or 27 in a socket formed at least in part by the channel 24 of the rack 15 as shown in FIGS. 1A and 1B. Therefore, children will likely want to place their scooters 8 in the racks 15 of the present invention. Thus, the rack 15 helps maintain an orderly garage or other storage location between uses of the scooters 8.

Figure 1C:
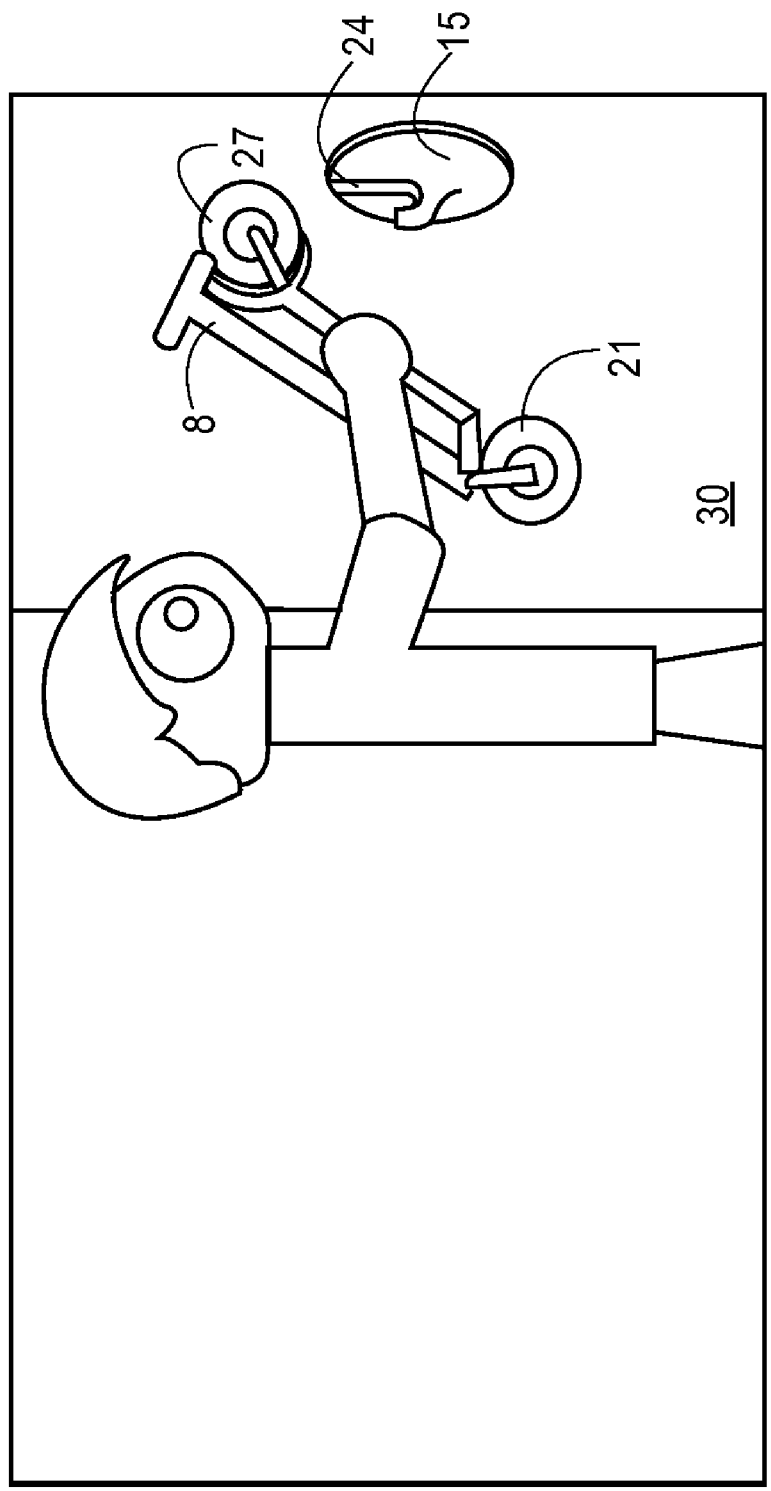
Figure 1D:
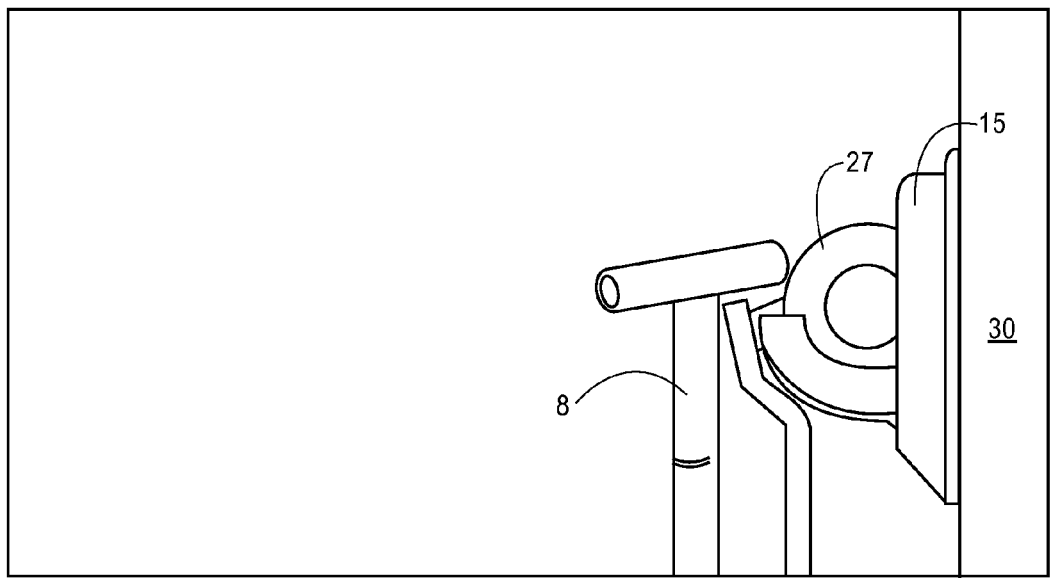

The rack 15 is not limited to placement or mounting on the floor 18. Rather, the rack 15 may be mounted on a wall 30 or any surface where a user desires to store a scooter 8, as shown in FIG. 1C. The scooter 8 has been folded so that a handle extends generally parallel to the platform. The rear wheel 27 is oriented for placement in the channel 24 of the rack 15. A user may insert the wheel 27 first and then let the scooter 8 swing downward toward the wall 30, as shown in FIG. 1D. Alternatively, the user may insert the front wheel 21 and let the scooter, handle, and rear wheel 27 hang downwardly. A surface of the rack 15 may be made to abut a portion of some specific models of scooters, or most scooters, in order to inhibit contact by the scooter with the wall 30 on which the scooters 8 and racks 15 are hung. In any case, it may be appreciated that the placement of the racks and scooters on a wall also provide an orderly and attractive alternative to storing scooters between uses.

FIGS. 2-7 show perspective views of the rack 15 from a variety of angles. As shown, the rack may include a disc shaped base 33 with a raised central part 36. That is, the raised part 36 may be integral with the disc shaped portion 33. Alternatively, the rack may be formed of a plurality of parts and/or portions joined together. An arcuate finger 39 may be supported on the raised part 36 and extend in a height direction away from the base 33.

The arcuate finger 39 may have a finger channel 42 for complimentarily receiving the wheel of a scooter as shown and described above with regard to FIGS. 1A-1D. As shown in FIGS. 2-7, the arcuate finger may be integrally formed with or added onto the base and have a lower end thereof received in the channel 24 of the base 33. In fact, the size and shape of the socket formed by the arcuate finger channel 42 and the base channel 24 may be slightly larger than peripheral portions of the wheels of a vehicle to be supported on the rack 15. On the other hand, witdthwise concave edges of the arcuate finger 39 may define an opening for unobstructed reception of forks, axles, and/or fasteners of the scooters 8. A widened opening surrounding the lower end of the arcuate finger 39 also provide space for forks, axles, fasteners and/or other structure associated with scooters or other vehicles.

As shown in FIGS. 3-7, through openings 45 may extend through the base 33 for receiving mounting bolts during mounting of the rack 15 on a floor 18 or wall 30. As shown in FIGS. 3-6, it is apparent that the raised portion 36 may be broad near a rear and progressively narrow toward a front in a depth direction of the rack 15. In other words, the upper edge of the generally horseshoe-shaped raised portion 36 has a greater thickness in the curved part of the horseshoe shape. Thus, the base channel 24 may open outwardly in a depth direction through a narrow end of the raised portion 36. The arcuate bottom 48 may be generally level in the depth direction or may slope downwardly and forwardly toward the arcuate finger 39. Either or both of the level and sloped configurations may urge a wheel toward the arcuate finger 39. This may be accomplished in the configuration with a level base channel 24 by the fact that the base has a through opening 51 that extends through the base between the arcuate bottom 48 of the base channel 24 and the arcuate finger 39. Thus, this through opening 51 may form a type of depression into which a wheel may be urgingly received under the influence of gravity. This is especially the case if the radius of the wheel is smaller than a length of the through opening 51 in the depth direction.

The width of the raised part 36 of the base 33 provides greater strength against torque loads, for example when a sideways tipping load is being applied to the scooter 8 while it is in the rack. Also, the broadened raised part 36 will support large sheer forces including those when the scooter 8 is hung with great force on a vertical wall mounted orientation or when the scooter is rollably inserted into a floor mounted rack 15 with great force. The raised part 36 provides great strength and is aesthetically appealing at the same time.

Figure 2:
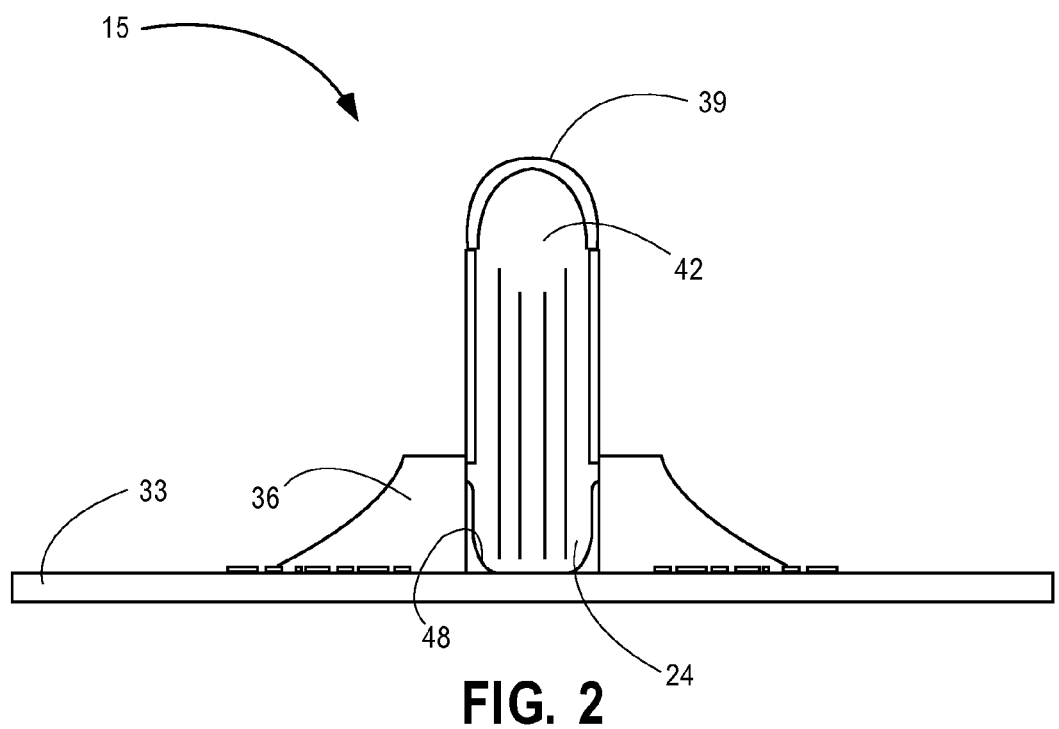
FIG. 2 is a front perspective view of the vehicle rack according to the present invention.
Figure 3:
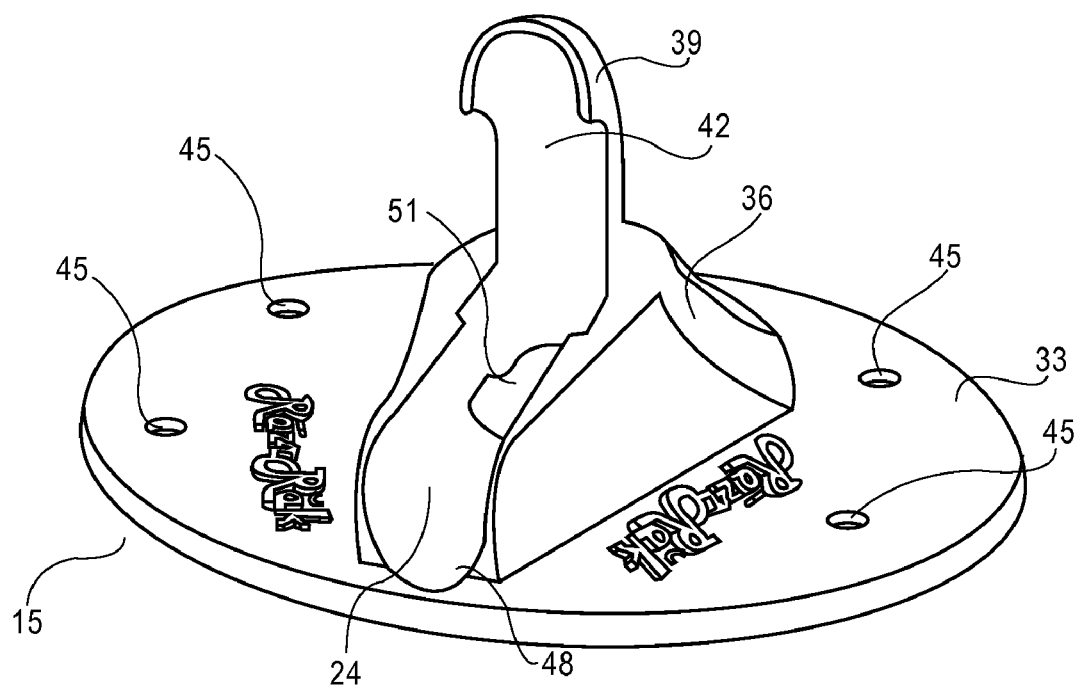
FIG. 3 is a perspective view of the front of the vehicle rack according to the present invention.

FIG. 2 is a front view taken in a depth direction showing how the arcuate surface of the arcuate bottom 48 extends below an upper surface of the disc shaped portion of the base 33. FIG. 2 also plainly shows the width of the base 33 relative to a height of the arcuate finger 39. Clearly the width of the base 33 may be twice or more than a height of the arcuate finger 39. The raised part 36 may also be tapered toward the disc shaped portion 33 in an arcuate descent from a upper edge or platform of the raised part 36. Thus, force concentration may be avoided.

Figure 4:
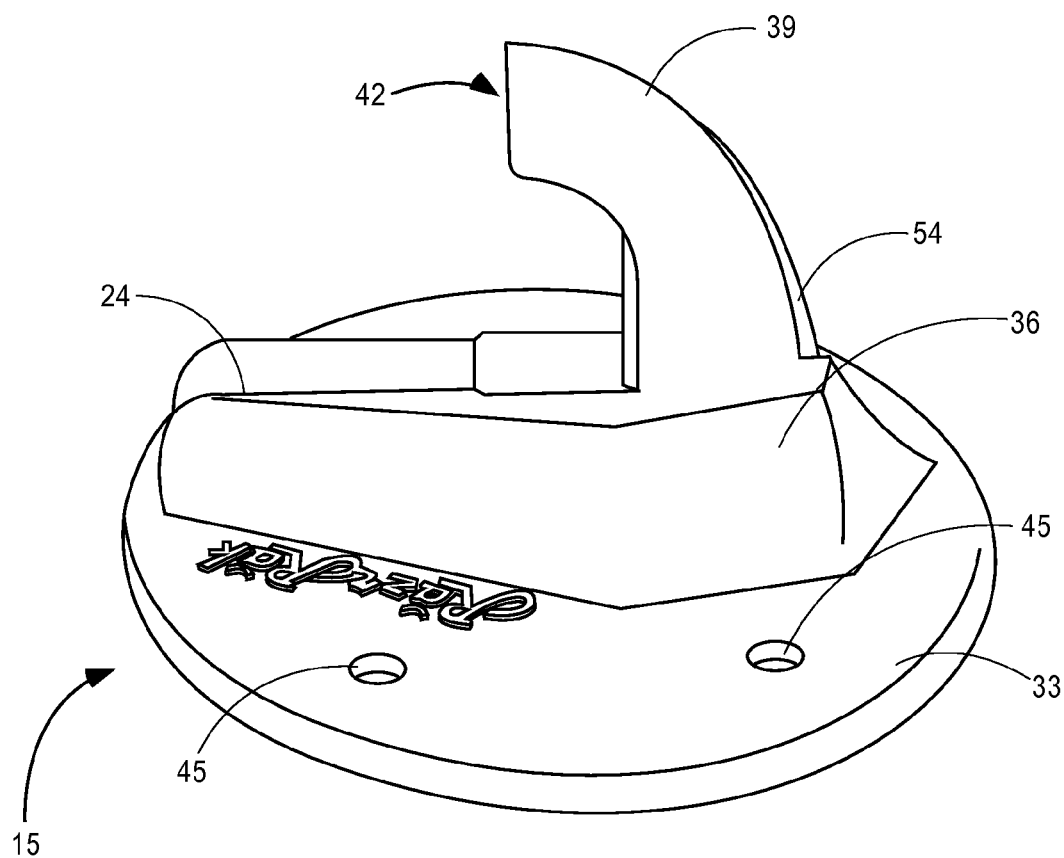
FIG. 4 is a perspective view of the side of the vehicle rack according to the present invention.
Figure 5:
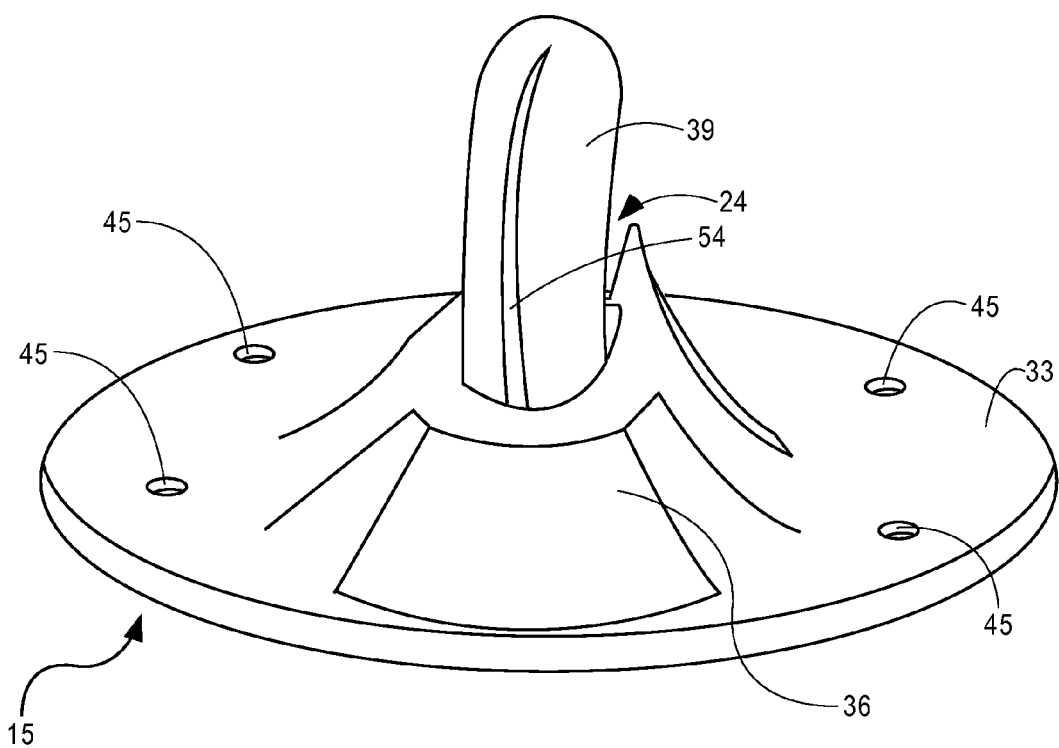
FIG. 5 is a perspective view of the rear of the vehicle rack according to the present invention.

FIG. 5 is a rear view of the rack 15. In this view, the tapered raised part 36 is also shown. Also a strengthening dorsal fin 54 may extend between the raised part 36 and the arcuate finger 39. FIG. 4 is a side view taken in a width direction showing the progressively larger dimension of the dorsal fin in depth direction toward the raised part 36.

Figure 6:
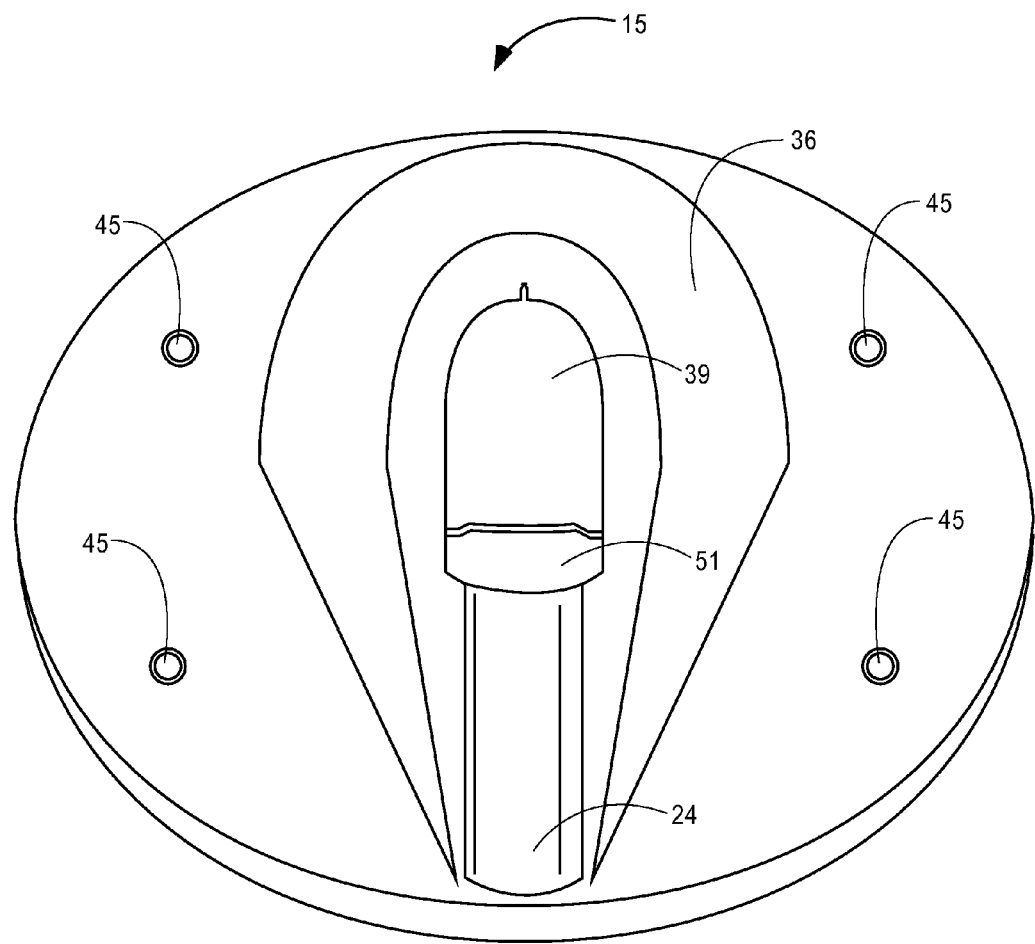
FIG. 6 is a top view of the vehicle rack according to the present invention.

FIG. 6 is a top plan view of the rack 15. In this view, it is apparent that the arcuate finger 39 may overlie the base channel 24 and the through opening 51 formed therein.

Figure 7:
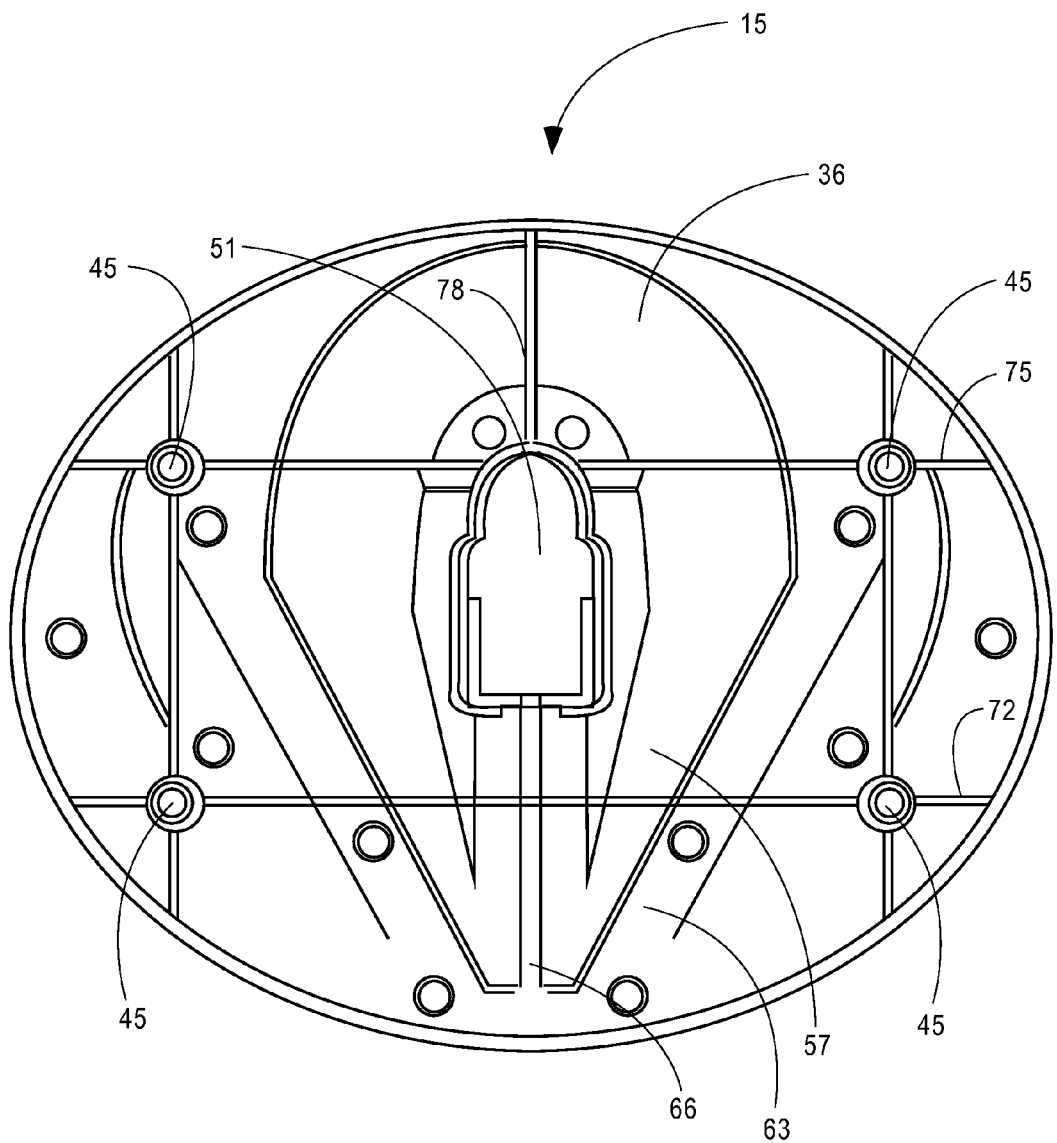
FIG. 7 is a bottom view of the vehicle rack according to the present invention.

FIG. 7 is a bottom plan view of the rack 15 in accordance with an embodiment of the present invention. As shown, the raised part 36 may be generally hollow with a lower surface 57 extending between a lower surface of an upper edge or platform of the raised part 36 and a lower surface 63 of the disc shaped portion of the base 33. A lower surface 66 of the arcuate bottom of the channel 24 of the base is also illustrated.

Strengthening web elements 72, 75, and 78 may extend between two or more of these lower surfaces to provide strength and rigidity. Alternatively, the raised portion could be formed or added on as a solid piece of material.

A method for using the rack 15 includes mounting the rack to one of a vertical and a horizontal surface followed by inserting a wheel of the scooter 8 into the socket created by channel 24 and arcuate finger channel 42. The rack 15 is versatile in that the rack 15 can be mounted to either a vertical or a horizontal surface without modification and the socket can accommodate either the front wheel 21 or the rear wheel 27 of the scooter 8.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the present invention.

What is claimed is:

1. A rack for a wheeled vehicle, comprising:
   a base;
   a raised portion extending away from said base and having a first outer wall;
   a finger extending away from said raised portion and having a second outer wall, whereby the first outer wall is substantially different from the second outer wall, wherein a first channel is disposed within a space defined between the base and the first outer wall of the raised portion such that a lower surface of the first channel is defined in the top of the base such that the lower surface supports a wheel of the vehicle, and a second channel disposed in the finger, and further wherein the finger is an arcuate finger such that the second outer wall extends in both a vertical and a depth direction overlying at least a portion of the first channel; and
   at least one mounting element disposed in said base, wherein the at least one mounting element is disposed such that the rack is mounted one of vertically or horizontally, such that a wheel of the vehicle can be placed within the channels.

2. The rack of claim 1, wherein the at least one mouning element is disposed such that the rack is mounted vertically.

3. The rack of claim 1, wherein the first channel and the second channel define a socket.

4. The rack of claim 3, said socket being capable of receiving and surrounding the wheel.

5. The rack of claim 1, wherein the base is generally disc shaped.

6. The rack of claim 1, wherein the outer wall of the raised portion tapers downwardly and away from the first channel.

7. The rack of claim 1, wherein the outer wall of the raised portion comprises a generally horseshoe-shaped configuration surrounding the first channel.

8. A method for using a rack for a wheeled vehicle comprising:

providing a base, a raised portion extending away from said base and having a first outer wall; providing a finger extending away from said raised portion and having a second outer wall, whereby the first outer wall is substantially different from the second outer wall, providing a first channel disposed within a space defined between the base and the first outer wall of the raised portion such that a lower surface of the first channel is defined in the top of the base such that the lower surface supports a wheel of the vehicle; providing a second channel disposed in the finger, and providing the finger such that the finger is an arcuate finger such that the second outer wall extends in both a vertical and a depth direction overlying at least a portion of the first channel; and inserting a wheel of the vehicle within the first and second channels for stabilizing and inhibiting sideward tipping of the vehicle by such insertion and mounting the rack to one of a vertical surface and a horizontal surface prior to inserting.

9. The method of claim 8, further comprising abutting the wheel on both sides of the wheel in a width direction of the wheel.

10. The method of claim 9, further comprising positively stopping the wheel by a depth abutment supported on the base.

11. The method of claim 10, further comprising urging the wheel toward the depth abutment by a slope extending downwardly and forwardly toward the depth abutment in the first channel receiving the wheel.

12. The method of claim 10, further comprising abutting the wheel with a first height abutment in the second channel of the raised portion of the base of the rack and abutting the wheel with a second height abutment overlying the first height abutment.

13. The method of claim 8, wherein the mounting step further comprises mounting the rack to the vertical surface such that the finger extends at least one of outwardly and upwardly.

* * * * *

UNITED STATES PATENT AND TRADEMARK OFFICE
CERTIFICATE OF CORRECTION

PATENT NO. : 7,690,516 B1  Page 1 of 1
APPLICATION NO. : 11/555917
DATED : April 6, 2010
INVENTOR(S) : Jeffrey D. Crump It is certified that error appears in the above-identified patent and that said Letters Patent is hereby corrected as shown below:

Claim 2 line 1 should read --...the at least one mounting element...--

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,690,516 B1 | Page 1 of 1 |
| APPLICATION NO. | : 11/555917 | |
| DATED | : April 6, 2010 | |
| INVENTOR(S) | : Jeffrey D. Crump | |

It is certified that error appears in the above-identified patent and that said Letters Patent is hereby corrected as shown below:

Column 6, Claim 2 line 58 should read --...the at least one mounting element...--

This certificate supersedes the Certificate of Correction issued May 25, 2010.

Signed and Sealed this

Twenty-second Day of June, 2010

David J. Kappos
*Director of the United States Patent and Trademark Office*